United States Patent [19]

McMorris

[11] Patent Number: 4,989,473
[45] Date of Patent: Feb. 5, 1991

[54] SHIFT ASSEMBLY FOR SHIFTING BETWEEN DRIVE POSITIONS IN A FOUR-WHEEL DRIVE VEHICLE

[75] Inventor: Michael L. McMorris, Milwaukie, Oreg.

[73] Assignee: Warn Industries, Inc., Milwaukie, Oreg.

[21] Appl. No.: 418,534

[22] Filed: Oct. 10, 1989

[51] Int. Cl.$^5$ .......................... G05G 9/10; G05G 5/02; B60K 17/344
[52] U.S. Cl. .................................. 74/475; 74/473 R; 74/538; 180/247; 180/336
[58] Field of Search ..................... 74/473 R, 475, 538; 180/247, 336

[56] References Cited

U.S. PATENT DOCUMENTS

| | | | |
|---|---|---|---|
| 4,077,276 | 3/1978 | Knox, Jr. ................. | 74/475 |
| 4,126,054 | 11/1978 | Langford et al. ....................... | 74/475 |
| 4,191,064 | 5/1980 | Houk et al. ........................ | 74/475 |
| 4,324,149 | 4/1982 | Johansson et al. ............... | 74/473 R |
| 4,356,879 | 11/1982 | Uchiyama .......................... | 74/475 X |
| 4,365,522 | 12/1982 | Kubota et al. ....................... | 74/475 |
| 4,508,190 | 4/1985 | Uchiyama ......................... | 74/473 R |
| 4,612,820 | 9/1986 | Behrens ............................ | 74/475 |
| 4,651,848 | 3/1987 | Kobayashi et al. ............... | 74/477 X |

FOREIGN PATENT DOCUMENTS 63-154427  6/1988  Japan .................................. 180/247

OTHER PUBLICATIONS

Drawing Nissan.

Primary Examiner—Allan D. Herrmann
Attorney, Agent, or Firm—Robert L. Harrington

[57] ABSTRACT

A shift assembly for shifting the gears of a transfer case of a vehicle as between two-wheel drive, four-wheel drive, neutral and four wheel drive range. A mounting plate rigidly mounted to the transfer case has a bottom configuration characterized by two cut out portions separated by a dependent landing portion. The shaft rod and its support housing are pivoted to the plate with a locating pin protruded from the shift rod through the housing and into the configured cut out portions of the mounting plate. The shift rod is biased upwardly relative to the support housing and is retained by the upward biasing into whichever of the cut out portions it is positioned. Repositioning is accomplished by depression of the rod against the upward biasing and pivoting of the rod to position the locating pin to the other cut out portion or on the landing portion separating the cut out portions. A depression in the landing portion identifies the neutral position. The locating pin additionally functions, due to its protrusion through the support housing, to retain the assembly of the shift rod in the support housing and prevent turning of the shift rod and locating pins.

5 Claims, 3 Drawing Sheets

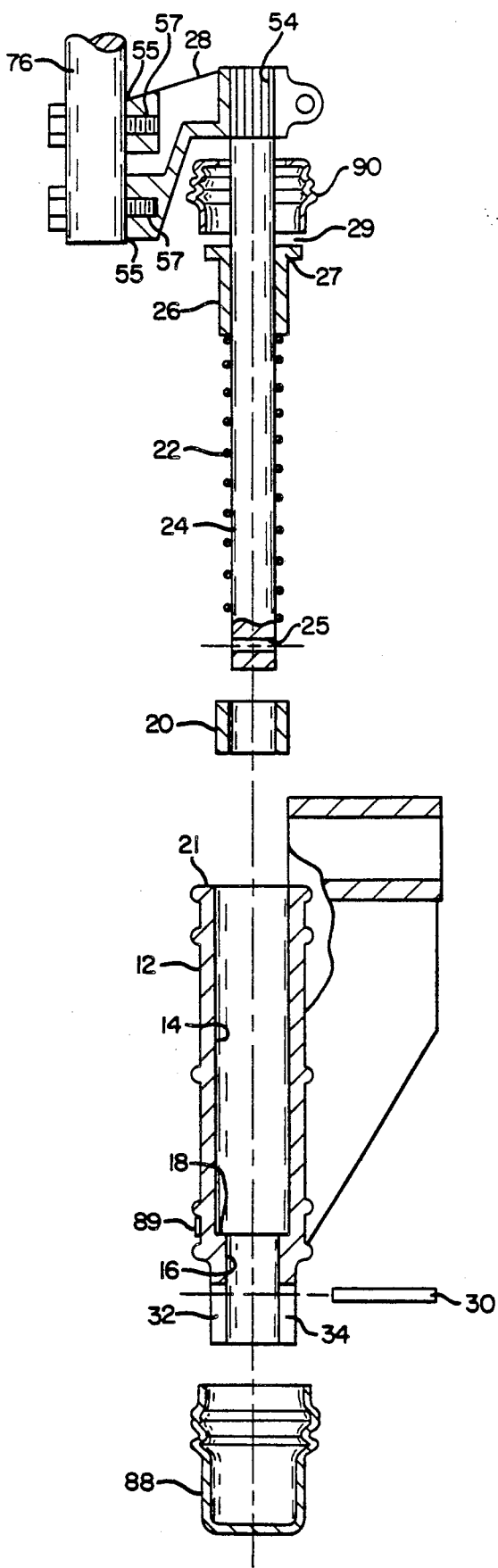

SHIFT ASSEMBLY FOR SHIFTING BETWEEN DRIVE POSITIONS IN A FOUR-WHEEL DRIVE VEHICLE

BACKGROUND OF THE INVENTION

1. Field of the Invention

This invention relates to shift mechanisms and in particular it relates to a multiple position shift mechanism for shifting between various positions of two-wheel drive and four-wheel drive of a four-wheel drive vehicle.

2. Background Information

Four wheel drive vehicles are commonplace on the roadways today. They provide added traction when needed under adverse weather conditions where a user may encounter mud, snow, and ice. They also provide mobility in off-the-road travels where soft terrain is encountered When traveling on the normal hard surface of the roadways the vehicle is operated in the two-wheel drive mode. The vehicle may be shifted to conventional four-wheel drive when encountering ice or snow on the roadway and then to low range four-wheel drive when driven off the road where the terrain demands both four-wheel drive and low range power. A neutral position is also desirable for towing the vehicle.

Having the ability to change or shift between the different positions as desired requires a shift mechanism to shift the gears within the vehicle's transfer case.

Shifting mechanisms in prior devices have not provided a secure neutral position or the desired operator feel when positioned in neutral. Also, the multiplicity of parts and the complexity of manufacture makes prior devices expensive to manufacture and assemble. When repairs are required, it is a major task to disassemble, replace worn or broken parts and reassemble.

SUMMARY OF THE PRESENT INVENTION

The preferred embodiment of the present invention includes a detent for the neutral positions and simplifies the gear shift mechanism by utilizing structure and components that perform multiple functions and therefore reduces the number of parts in the assembly.

The locking pin of the present invention performs multiple functions: it is a stop pin that engages formed slots to indicate the operating mode, it limits the upward travel of the plunger shaft, it prevents rotation of the shaft within the shaft housing, and it retains the shaft within the housing. The above features and the advantages thereof will become more apparent by reference to the following detailed description and the drawings.

BRIEF DESCRIPTION OF THE DRAWINGS

FIG. 4 is an exploded view of the shift assembly of FIGS. 1-3; and

DESCRIPTION OF THE PREFERRED EMBODIMENT

Figure 1:
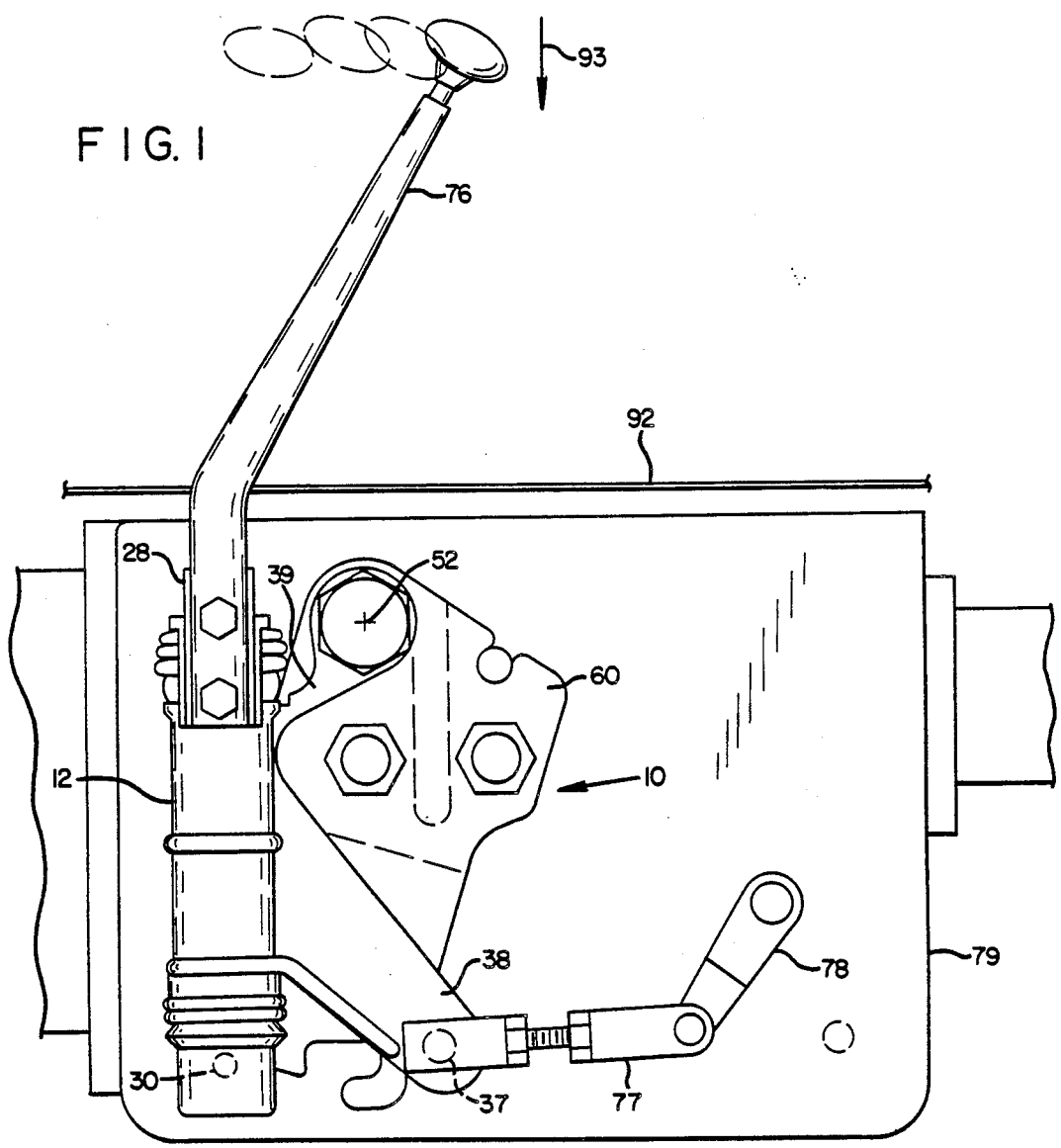
FIG. 1 shows a shift assembly mounted on a transfer case in accordance with the present invention.

As generally illustrated in FIG. 1, a shift assembly 10 is mounted to a vehicle by bolting the mounting plate 60 of the shift assembly 10 to a side of the transfer case 79 of the vehicle. The transfer case 79 is typical of four-wheel drive vehicles and includes movable gears that interconnect and disconnect the vehicles drive train to achieve four-wheel drive, two-wheel drive, four-wheel drive low range and neutral. The mechanism within the transfer case 79 is conventional and the reader need only understand that shifting of pivot arm 78 among the four pivot arm positions illustrated, achieves the desired shifting of the gears to the different drive positions.

A shift lever 76 is fastened to a plunger head 28 of the shift assembly and extends through the floor 92 of the vehicle and into the operator's compartment where it is situated to be in comfortable operating reach of the operator. Through manual maneuvering of the lever 76, as indicated by the solid and dotted line positions of lever 76 in FIG. 1, the shift assembly 10 transfers the lever movement to axial movement of shift rod 77 which locates the shift arm 78 of the transfer case for desired location of the gears inside the transfer case 79.

Figure 3:
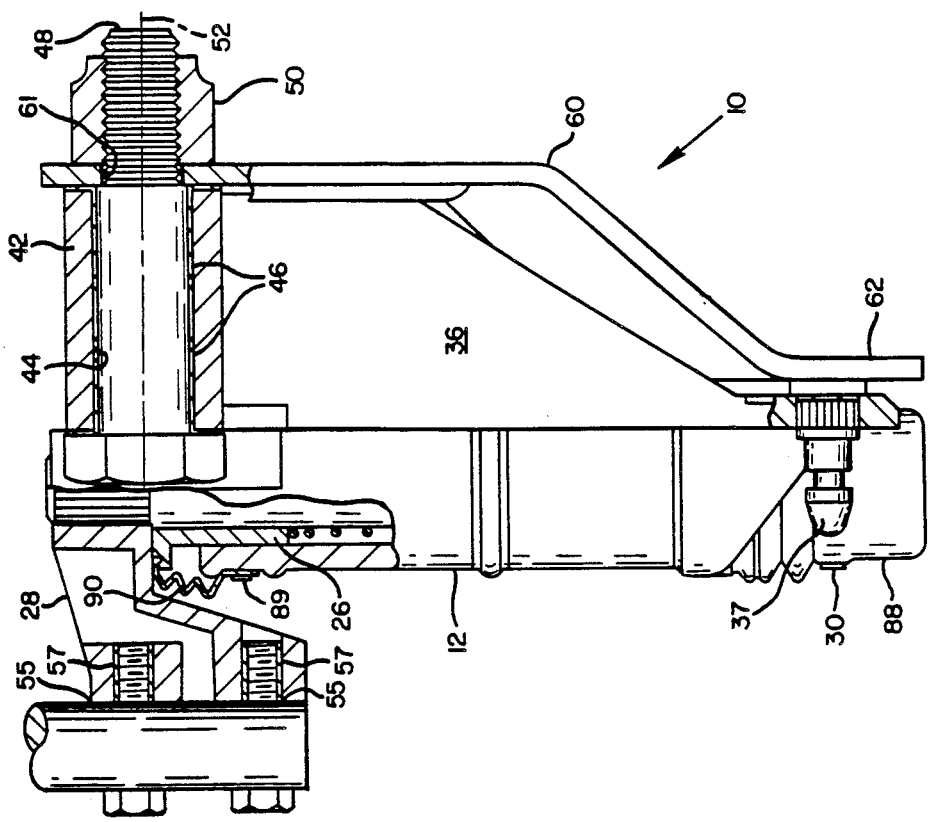
FIG. 3 is a side view of the shift assembly of FIG. 2.
Figure 2:
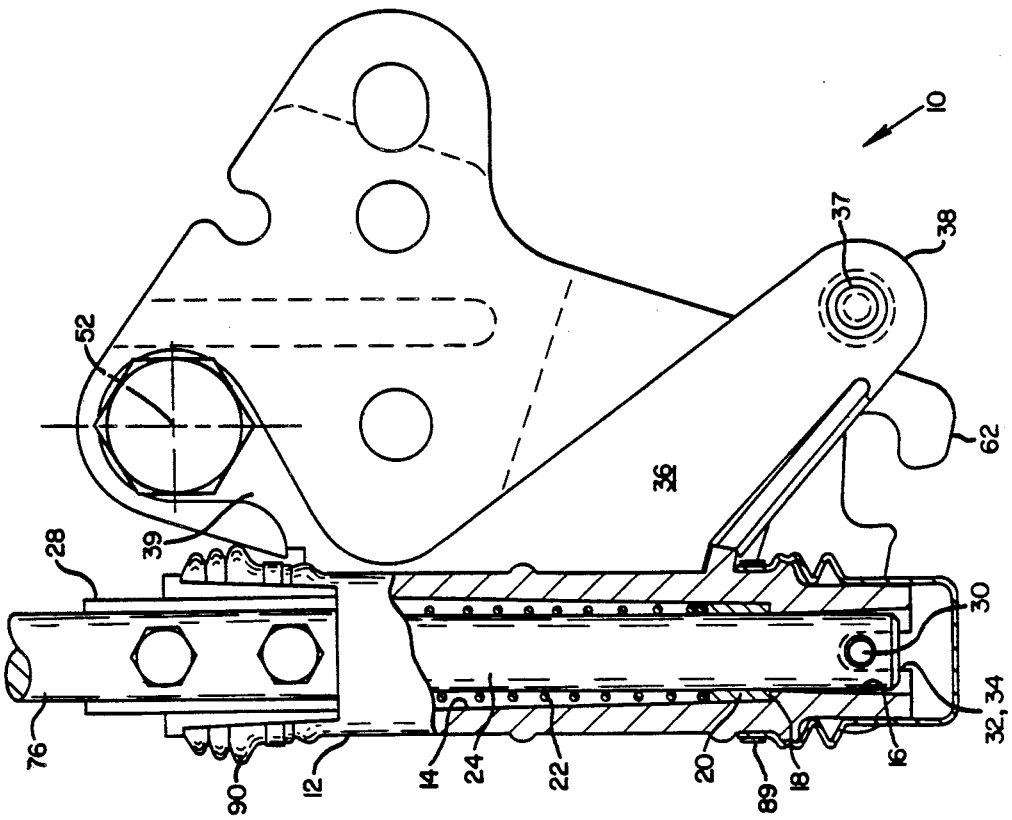
FIG. 2 is an enlarged view of the shift assembly as viewed in FIG. 1

Referring now to FIGS. 2-4, the shift assembly 10 as described generally above in connection with FIG. 1 has a mounting plate 60 for rigidly mounting the assembly to the transfer case 79. Pivotally mounted on the mounting plate 60 is an integral pivot arm structure 36 and plunger shaft housing 12.

In FIG. 4, the plunger shaft housing 12 and related items are shown in exploded view for clarity. The housing 12 is basically cylindrical in shape and has a through bore with the upper bore portion 14 greater in diameter than the lower bore portion 16 A step 18 is formed at the junctures of the bores 14 and 16. A lower bushing 20 fits within the bore 14 and abuts against the step 18 at the juncture of the bores 14 and 16.

The bore of the bushing 20 provides a bearing surface for a plunger shaft 24 and permits axial movement of the shaft 24 within the bushing 20.

Two open ended slots 32 and 34 are formed at the lower end of the housing 12. The slots 32 and 34 are on opposite sides of the lower end of the housing 12 in the wall of the bored section 16 and are parallel to the longitudinal axis of the bore 16. The slots are of a dimension to accept a lock pin 30 that is installed in a cross bore 25 of the shaft 24 when the shaft is installed in the housing 12. The lock pin 30 limits the upper travel of the shaft 24 and also prevents rotation of the shaft 24 by reason of its engagement with the slots 32 and 34.

A helical compression spring 22 having an outside diameter less than the bore 14 and an internal diameter larger than shaft 24 is placed within the bore and is in contact with the upper edge of the lower bushing 20 The bushing 20 is captured between the spring 22 and the step 18. An upper bushing 26 is pressed on the upper end of the shaft 24, with the shaft 24 extending through the bore of the bushing 26 to facilitate the installation of the plunger head 28.

The bushing 26 has a shoulder 27 that will engage the upper edge 21 of the housing 12 thus limiting the downward travel of the bushing 26 and attached plunger shaft 24 in the housing 12. The bushing also has a groove 29 in the top end to engage the protective boot 90. The boot is captured between the upper end of bushing 26 and the bottom side of the plunger head 28 during assembly.

The plunger head 28 has a bore 54. The top end of the shaft 24 is projected into the bore 54 and rigidly affixed thereto. The plunger head 28 has a flanged end 55 with mounting holes 57 for attaching the shift lever 76.

Near the lower end of the shaft 24 is a cross bore 25. It is bored to accept an interference fit with the lock pin 30. The plunger shaft 24 with the plunger head 28 and bushing 26 installed, fits within the upper bore 14 of the housing 12 with the shaft 24 extending through the lower bushing 20 and into the lower bore 16 of the housing 12.

The upper bushing 26 enters the bore 14 at the upper end of the housing 12. The spring 22 is thus placed in compression between the lower bushing 20 and the upper bushing 26. The upper bushing 26 is captured against the rigidly attached plunger head and therefore the outside diameter of the bushing is in sliding contact with the bore 14 of the housing 12. The shoulder 27 of the bushing 26 limits the downward travel of the shaft 24 by contacting the upper edge of the housing 12. The spring 22 being captive between the lower bushing 20 and the upper bushing 26 provides an upward force that urges the shaft 24 upward. The upward motion of the shaft 24 within the housing is limited by the lock pin 30 mounted in the counter-bore 25 of the shaft 24 coming into contact with the upper ends of the formed slots 32 and 34 in the lower end of housing 12.

The pivot arm structure 36 is preferably integrally formed with the housing 12 of the assembly. The structure 36 extends from the housing 12 and has an upper arm 39 and a lower arm 38. The arms 38 and 39 joining together to form the pivot arm structure 36. The upper arm 39 extends upward and outward from the upper end of the housing 12 as viewed in FIG. 2. The outer extension of the arm 39 as viewed in FIGS. 2 & 3 has a cylindrical type section 42 that has a through bore 44. Flanged pivot bushings 46 are inserted into each end of the bore 44.

The lower arm 38 extends outward and downward from the housing 12 as viewed in FIG. 2. A link pin 37 is rigidly affixed to the lower portion of the arm 38. To pivotally mount the integral housing 12 and the pivot arm structure 36 to the base plate 60, a shoulder bolt 48 is inserted into the bushings 46 (which have been installed in the bore 44). The shoulder bolt extends through the bushings 46 and through the bore 61 of the mounting base plate 60 with the threaded portion of the bolt extending beyond the base plate 60. A lock nut 50 secures the shoulder of the bolt 48 against the face of the base 60 adjacent the bore 61. The bolt thus being securely affixed to the base 60 provides an axis of pivot 52 for the integral housing 12 and arm structure 36.

A shift rod 77 (FIG. 1) connecting the arm 38 to the transfer case 79 is attached to the link pin 37 and to a shift arm 78.

The base plate 60 is configured to place its lower section 62 in close proximity to the slots 32 and 34 in the lower end of the housing 12, with the configured open slots of the lower section 62 accepting the protruding end of locking pin 30. Pivoting of the integral housing 12 and arm structure 36 about pivot axis 52 will change the position of the locking pin 30 in the configured lower section 62.

Figure 5:
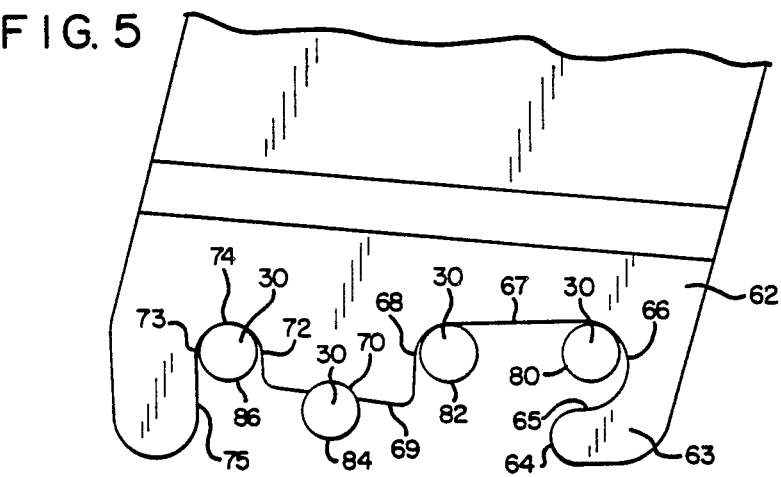
FIG. 5 is partial view of the mounting plate of the shifting assembly of FIGS. 1-4 illustrating the multiple positions.

The lower section 62 of the mounting plate 60 is illustrated in FIG. 5 which shows the end of the locking pin 30 superimposed in the four desired positions. The four positions represented by the numerals 80, 82, 84, and 86 represent the four operating modes of the four-wheel drive vehicle.

They are;
$\leq$80 - two-wheel drive,
$\leq$82 - four-wheel drive,
$\leq$84 - neutral, and
$\leq$86 - four-wheel drive low-range.

A first configured elongated slot having one side partially open is bounded by ends 66 and 68, side edge 67 and a partial side edge 65 formed by the appendage 63. The appendage 63 also has a stop face 64. An edge 69 of the lower section 62 extends from the end 68 of the first elongated slot to the side edge 72 of a second slot. The edge 69 has an arcuate depression 70 near its midpoint. The second slot is an open ended slot and is bounded by side edges 72, 73 and end 74. The side edge 73 extends downward forming the stop face 75. A further explanation will be made under the section describing the operation.

Protective boots 88 and 90 are provided for the lower and upper ends of the housing 12 to protect the components from the elements of the surrounding environment. The lower boot 88 has apertures that fit snugly over each end of the lock pin 30. The boot 88 is attached to the housing 12 by a tie wrap 89. One end of the upper boot 90 is captured between the under side of the plunger head 28 and the top of the upper bushing 26 during assembly. A groove 29 in the top of the upper bushing 26 aids in retaining the boot 90 in position. The boot 90 is attached to the housing 12 by another tie wrap 89.

OPERATION

Under most operating conditions the lever 76 (FIG. 1) would be in the position to place the locking pin 30 in the first configured elongated slot as indicated by the position 80 (FIG. 5). This would be two-wheel drive operating mode. To shift to four-wheel drive, the operator would merely move the lever in a direction toward the rear of the vehicle until the locking pin 30 engages the end 68 of the elongated slot which limits the travel of the shift lever. Note that when the shift lever is moved the integral housing 12 and pivot arm structure 36 is pivoted about the pivot axis 52 which moves the shift rod 77 attached to the lower arm 38.

To shift the gears of the transfer case 79 into neutral position the operator would depress the shift lever 76 (as indicated by arrow 93) which moves the plunger head 28, upper bushing 26, and plunger shaft 24 down. Spring 22 is compressed and locking pin 30 moves downward in the slots 32 and 34. The pin 30 exits the first configured slot permitting further motion of the shift lever 76 in a rearward direction. (The downward travel of the shaft 24 being limited by the shoulder 27 of the bushing 26 coming into contact with the upper edge 21 of the housing 12, see FIG. 4).

The pin 30 being biased upward by the spring 22 will cause the pin 30 to enter the depression 70 to signify that the transfer case 79 is in the neutral position. Since the neutral position is a mere depression the operator may move the shift lever from neutral without depressing the shift lever. The operator merely has to overcome the resistance offered by the pin 30 being biased into the depression 70 by the spring 22. Further travel of the shift lever rearward places the locking pin 30 at the stop face 75 of the second slot and the upward force imparted by the spring 22 will cause the pin 30 to move upward into the second slot which provides a positive locking position for four-wheel drive low-range.

The stop pin 30 as previously mentioned is used to perform multiple functions. It limits the upper travel of the shaft 24, it prevents rotation of the shaft 24 in the housing 12, it acts as a locator for the four shift positions and it retains the shaft 24 in the housing 12. By simply removing the pin 30 from the bore 25 in the shaft 24, and the tie strap 89 securing the upper boot to the housing, the shaft may be removed from the housing 12.

Variations to the preferred embodiment are contemplated and therefore the scope of the invention should not be limited to the description set forth but is to be determined according to the appended claims.

What is claimed is:

1. A manually actuated shift assembly for shifting the gears in a transfer case of a four-wheel vehicle, said gears being shiftable to effect various vehicle drive positions as between two-wheel drive, four-wheel drive conventional, four-wheel drive low range and neutral, and an exposed shift member associated with said gears and movable between positions for selecting the various vehicle drive positions, said shift assembly comprising;

a configured base plate rigidly mounted relative to the transfer case, a support member pivotally mounted to the base plate and a shift rod mounted to the support member and axially slidable relative to the support member, biasing means biasing the shift rod to an upper axial position and manual control means for manually depressing the rod to a lower axial position, and a locating pin protruded from said shift rod, said configured base plate having a configured bottom edge including a pair of upwardly directed cut out portions separated by a depending landing portion and said cut out portions bracketed by depending stop portions, said locating pin selectively protruded from said shift rod into the cut out portions and being manually shiftable through a combination of movements including depression of the shift rod against the biasing means and pivoting the rod and support member relative to the base plate, said landing portion between the cut out portions including a depression wherein the locating pin is seated by the biasing means upon moving the shift rod to a position between the cut out portions.

2. A manually actuated shift assembly as defined in claim 1 wherein the support member is a cylindrical housing having a center opening slidably receiving the shift rod, said center opening in the cylindrical housing defining a top portion and a bottom portion, a first bushing member fixed in the bottom portion of the center opening of the housing through which the shift rod is slidable and a second bushing member fixed to the top of the rod, the second bushing member being slidable in the top portion of the center opening of the housing, and said biasing means comprising a spring opening of the housing, and said biasing means comprising a spring means between the first and second bushing members urging separation of the bushing members and thereby urging the shift rod to its upper position.

3. A manually actuated shift assembly as defined in claim 2 wherein said housing is provided with opposed vertically oriented slots in the bottom portion of the housing and defining an upper limit, said locating pin protruded through the shift rod and through the slots in the housing wall, said pin being limited in the upward movement by the upper limit defined by the slots and urged to the upper limit by the spring means.

4. A manually actuated shift assembly as defined in claim 3 wherein the locating pin functions to retain the shift rod, spring means and first bushing member in the center opening of the housing, and a singular act of removal of said locating pin from the shift rod enables removal of the shift rod, spring means and first bushing member from the housing.

5. A manually actuated shift assembly as defined in claim 4 wherein said manual control means is a shift lever connected to and protruded upwardly from the shift rod and through a floor of the vehicle whereat depression and pivoting of the shift lever produces the desired movement of the shift rod and housing.

* * * * *